United States Patent [19]

Morito et al.

[11] 4,227,214
[45] Oct. 7, 1980

[54] DIGITAL PROCESSING VERTICAL SYNCHRONIZATION SYSTEM FOR A TELEVISION RECEIVER SET

[75] Inventors: Hiroshi Morito; Kenji Yamashita, both of Tokyo, Japan

[73] Assignee: Nippon Electric Co., Ltd., Tokyo, Japan

[21] Appl. No.: 924,318

[22] Filed: Jul. 13, 1978

[30] Foreign Application Priority Data

Jul. 13, 1977 [JP] Japan .................. 52-84384

[51] Int. Cl.² .................. H04N 5/04; H04N 5/10
[52] U.S. Cl. .................. 358/148; 358/154; 358/158
[58] Field of Search .................. 358/148, 150, 152–155; 328/48, 62, 139, 63

[56] References Cited

U.S. PATENT DOCUMENTS

| | | | |
|---|---|---|---|
| 3,688,037 | 8/1972 | Ipri | 358/158 |
| 3,708,621 | 1/1973 | Yamamoto | 358/158 |
| 3,821,653 | 6/1974 | Fretwell | 328/62 |
| 3,878,335 | 4/1975 | Balaban | 358/148 |
| 3,878,336 | 4/1975 | Balaban | 358/155 |
| 3,899,635 | 8/1975 | Steckler et al. | 358/148 |
| 3,925,613 | 12/1975 | Kokado | 328/139 X |
| 4,083,176 | 4/1978 | Higashi | 328/48 X |
| 4,096,528 | 6/1978 | Tüma et al. | 358/148 |

Primary Examiner—Daryl W. Cook
Assistant Examiner—Aristotelis M. Psitos
Attorney, Agent, or Firm—Sughrue, Rothwell, Mion, Zinn and Macpeak

[57] ABSTRACT

A digital vertical synchronization system for use in a television receiver is disclosed. A vertical synchronization separator circuit receives a composite synchronizing signal and separates a vertical synchronizing signal from the composite signal. A clock counter receives a clock input signal having a frequency equal to a positive integer N times as high as the frequency of a horizontal synchronizing signal separated from the composite signal. The clock counter produces a first output signal having a repetition frequency substantially equal to the vertical synchronizing signal and having a pulse width required for generating a vertical deflection signal and a second output signal having a pulse width equal to or smaller than the pulse width of the vertical synchronizing signal. A phase comparator compares the phases of the second output signal of the clock counter and the vertical synchronizing signal and produces a reset signal when the phases of the two signals are not coincident. The reset signal is applied to the reset terminal of the clock counter.

6 Claims, 10 Drawing Figures

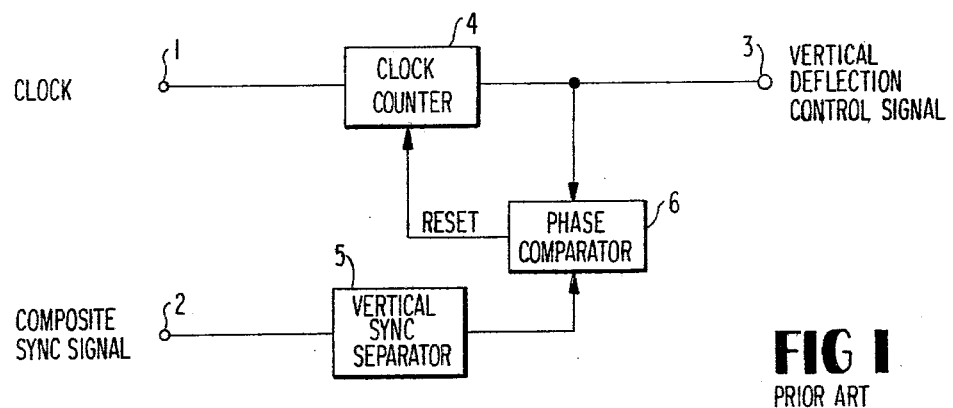
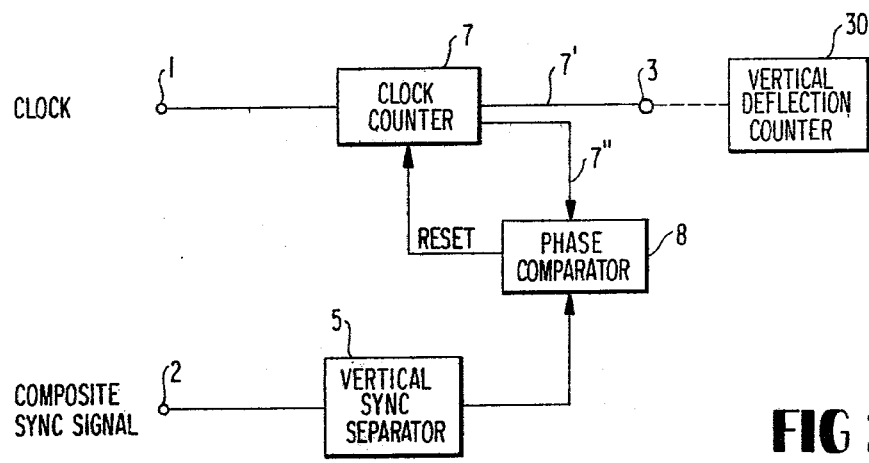
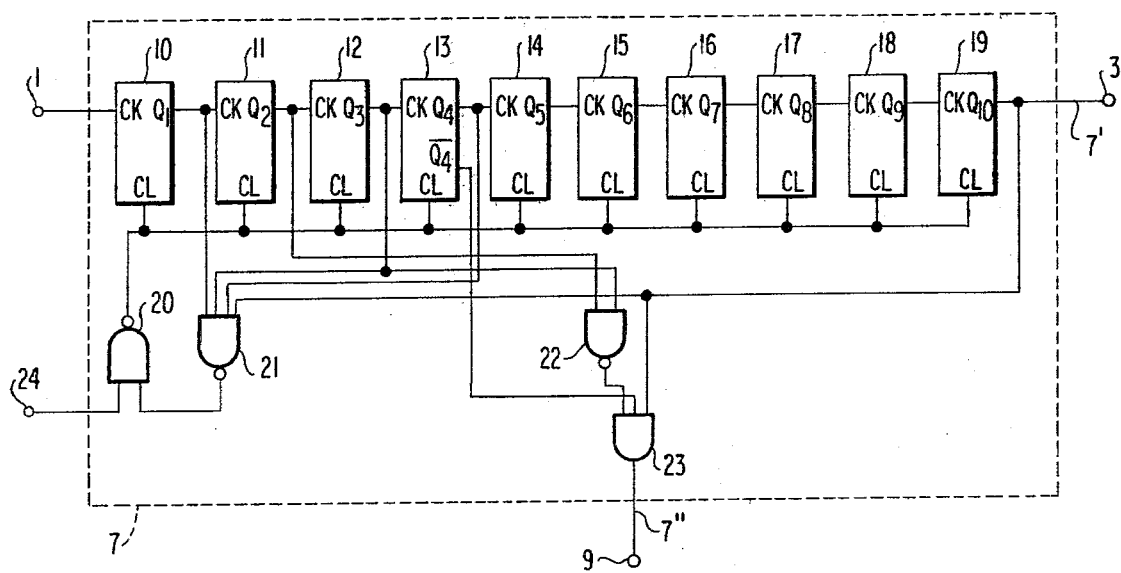

DIGITAL PROCESSING VERTICAL SYNCHRONIZATION SYSTEM FOR A TELEVISION RECEIVER SET

BACKGROUND OF THE INVENTION

The present invention relates to a digital vertical synchronization system for use in a television receiver set or the like, wherein a vertical synchronizing signal separated from a composite synchronizing signal is synchronized with a vertical deflection control signal obtained by counting clock pulses which are synchronized with a horizontal synchronizing signal separated from the composite synchronizing signal.

There have hitherto been proposed digital processing methods of horizontal and vertical synchronization systems in a television receiver set or the like.

In a digital vertical synchronization system of the prior art, a clock pulse having a frequency equal to, for example, twice that of a horizontal synchronization frequency is applied to a clock counter having T-type flip-flops which are connected in cascade, so that a vertical deflection control signal with a pulse width of 6.5H (where H denotes one horizontal scanning period) is produced at every given vertical scanning period. The phase of this vertical deflection control signal is compared with the phase of a vertical synchronizing signal with a pulse width of 3H separated from the composite synchronizing signal by a CR integrator. If these phases are not coincident, the clock counter is reset to make the phases coincide.

The vertical deflection control signal with the pulse width of 6.5H derived from the clock counter, however, has a larger pulse width in comparison with the vertical synchronizing signal with the pulse width of 3H separated from the composite synchronizing signal. As a result, if the repetition cycles of the vertical deflection control signal and vertical synchronizing signal are different slightly from each other, it takes a long time to detect the difference of those repetition cycles by a phase comparator and to reset the clock counter for making these phases coincide. This long time to detect the repetition cycles difference and to reset the clock counter causes a distorted appearance, and a small vibration, so-called jitter, in the reproduced picture on the screen of the television receiver set or the like.

SUMMARY OF THE INVENTION

An object of this invention is to provide a vertical synchronization system for accurately synchronizing the above-mentioned vertical deflection control signal with the vertical synchronizing signal, and for reproducing a stable picture without the occurrence of the picture distortion and the so-called jitter in a reproduced picture.

In accordance with this invention, a vertical synchronization system comprises a clock counter for counting a clock signal having a frequency equal to N (where N is a positive integer) times as high as the frequency of the horizontal synchronizing signal and for deriving a first output signal having a pulse width required for controlling the vertical deflection circuit, for example 6.5H, and a second output signal having a pulse width equal to or narrower than the pulse width of the vertical synchronizing signal separated from the composite synchronizing signal, and a comparator for comparing the second output signal and the vertical synchronizing signal and for producing an output resetting the clock counter in accordance with the difference in phase between the second output and the vertical synchronizing signal.

According to this invention, the second output signal from the clock counter, the phase of which is compared with the phase of the vertical synchronizing signal separated from the composite synchronizing signal, has a pulse width equal to or shorter than the pulse width of the vertical synchronizing signal, so that the comparator can detect the slight difference in phase of these signals, and can reset the clock counter within an extremely short time, even if the phases of the vertical synchronizing signal and the second output pulse from the clock counter are slightly out of coincidence. This difference in the phases can be detected immediately, even if the amount of this difference is small. As a result, picture distortion or small vibration does not appear in a reproduced picture on the screen of a television receiver set, and the picture is reproduced in a stable manner.

BRIEF DESCRIPTION OF THE DRAWINGS

The above and further objects, features and advantages of the present invention will become more apparent from the following detailed description of embodiments taken in conjunction with the accompanying drawings, wherein:

FIG. 1 is a block diagram showing a conventional synchronization system;

FIG. 2 is a block diagram showing a basic arrangement of a vertical synchronization system according to this invention;

FIG. 3 is a circuit diagram showing one embodiment of a clock counter used in this invention;

DESCRIPTION OF THE INVENTION

Figure 4:
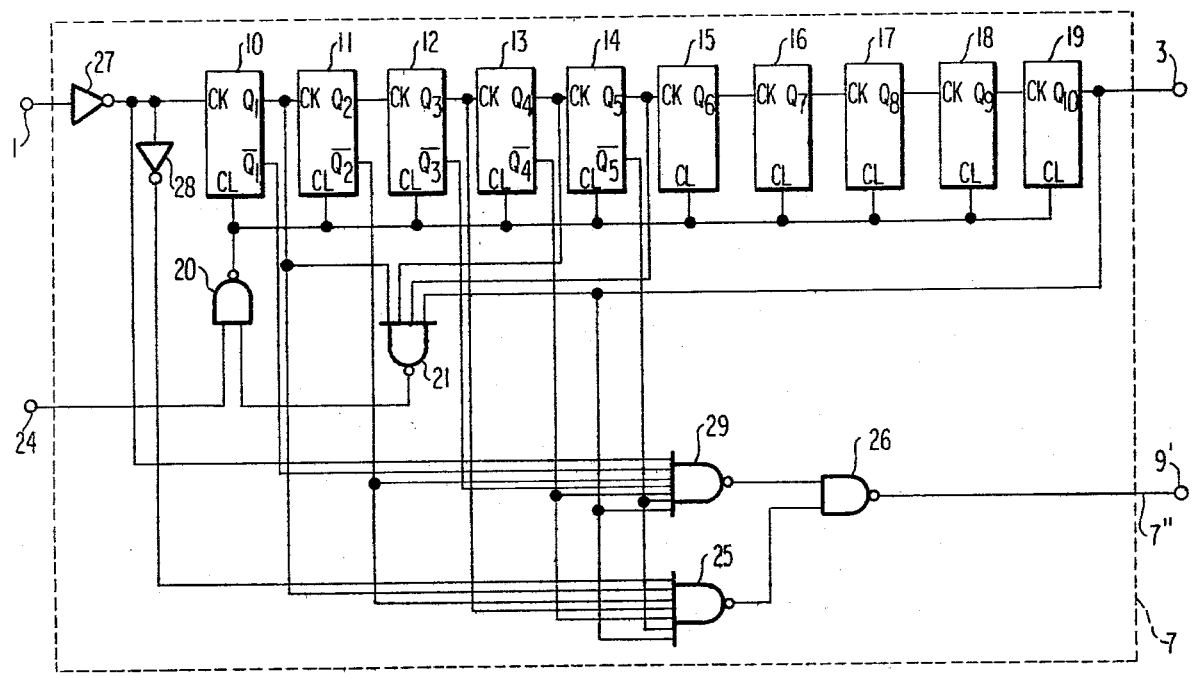
FIG. 4 is a circuit diagram showing another embodiment of a clock counter used in this invention.

Referring first to a prior art system shown in FIG. 1, a terminal 1 receives a clock signal having a repetition frequency equal to twice as high as the repetition frequency of the horizontal synchronizing signal. This terminal 1 is connected to a clock input terminal of a clock counter 4 composed of ten T flip-flops which are connected in series. The clock counter 4 derives a vertical deflection control signal at the output terminal 3 at the time from 513rd to 525th clock pulses. That is, the vertical deflection control signal has a width of 6.5H. This vertical deflection control signal is applied to a saw-tooth wave generator for obtaining a vertical deflection signal. A terminal 2 receives a composite synchronizing signal. This terminal 2 is connected to an input terminal of a vertical synchronization separator circuit 5. The output terminals of the clock counter 4 and the vertical synchronization separator circuit 5 are connected to the input terminals of a phase comparator 6. The phase comparator 6 compares the phase of the vertical synchronizing signal from the separator circuit 5 with the phase of the vertical deflection control signal from the clock counter 4 and produces a reset signal when the phases of these signals are not coincident. The output terminal of the phase comparator 6 is connected to a reset terminal of the clock counter 4 to reset the count of the counter 4 in response to the reset signal. The synchronization system of the prior art described above performs the operations of pull-in and maintenance of the synchronization between the vertical deflection control signal from the clock counter 4 and the vertical synchronizing signal separated from the composite synchronizing signal as follows.

Assuming that the vertical synchronizing signal obtained from the separator circuit 5 and the vertical deflection control signal from the clock counter 4 are in an asynchronous condition, then the phase comparator 6 detects that the phases of the two signals are not coincident and generates a reset signal to restart the counting operation in the clock counter 4. In accordance with this operation, the clock counter 4 performs the synchronization pull-in in such a way that the clock counter 4 supplies to a terminal 3 a vertical deflection control signal after counting 512 pulses of the clock pulses in response to the reset signal occurring at the time of the vertical synchronizing signal. After this pull-in operation, if the phase comparator 6 detects the coincidence of the phases of the vertical deflection control signal and the vertical synchronizing signal, the comparator 6 does not produce any reset signal and the clock counter 4 is not reset. As a result, the clock counter 4 supplies a vertical deflection control signal which is in synchronism with the vertical synchronizing signal.

Figure 5A:
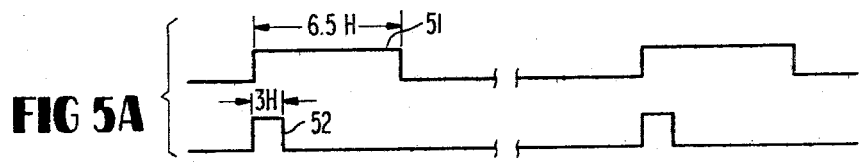
FIGS. 5A and 5B are timing charts illustrating the relationship between the vertical deflection control signal and the vertical synchronizing signal in the conventional synchronization system.
Figure 5B:
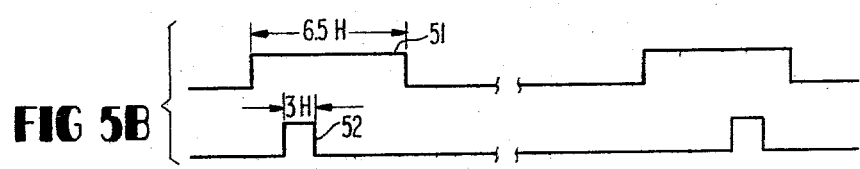

In this prior art system, the vertical deflection control signal from the clock counter 4 has a pulse width of 6.5H which is sufficient to control a saw-tooth wave generator, as shown by the numeral 51 in FIG. 5A. On the other hand, the vertical synchronizing signal has a pulse width 3H as shown by 52 in FIG. 5A. The phase comparator 6 does not perform its phase comparison operation for the lapse of a given dead period (i.e., a constant period which remains in the vertical output signal 51 after the disappearance of the vertical synchronizing pulse 52) after the phase comparison between the two signals is completed. As a result, the synchronization can be performed despite the difference in pulse widths of the vertical deflection control signal and the vertical synchronizing signal. However, if the repetition frequencies of the output pulse 51 in the vertical deflection control signal and the vertical synchronizing pulse 52 in the vertical synchronizing signal are slightly different from each other, as shown in FIG. 5B, the phase comparator 6 judges that these frequencies are coincident so long as the vertical synchronizing pulse 52 occurs within the period of the vertical deflection control pulse 51. In the meantime, if the vertical synchronizing pulse 52 occurs at the time that the vertical deflection control signal 51 disappears, then the comparator 6 produces the reset signal to reset the counter operation of the clock counter 4 and the output signal of the clock counter 4 is restored to its correct phase position. Consequently, it takes a long time to restore the correct phase, so that this prior art system has a disadvantage that the picture distortion due to synchronization disturbance or small vibration, so-called jitter, appears in a reproduced picture and that the reproduction of a stable picture cannot be expected.

One embodiment of this invention will be explained with reference to FIGS. 2 and 3, hereinafter. In FIGS. 2 and 3, the same reference numerals as in FIG. 1 designate like parts, so that the detailed explanation of these parts are omitted hereinafter.

In FIG. 2, a vertical synchronization system according to this invention has a clock counter 7 for producing a first output signal on a first output line 7' and a second output signal on a second output line 7". The first output signal has a repetition frequency equal to the repetition frequency of the vertical synchronizing signal and also has such a pulse width as required for the signal processing in the succeeding vertical deflection system 30, and a second output signal has a pulse width equal to the pulse width of the vertical synchronizing signal separated from the composite synchronizing signal applied to the terminal 2 by the vertical synchronization separator circuit 5. The clock counter 7 has a clock input terminal to which a clock signal having a frequency equal to arbitrary integer N times as high as the frequency of the horizontal synchronizing signal is applied through the terminal 1. The clock counter 7 has a reset terminal to which the output signal from a phase comparator 8 is applied. The phase comparator 8 receives the second output signal from the clock counter 7 and the vertical synchronizing signal from the vertical synchronization separator circuit 5 and produces a reset signal when the phases of these signals are not coincident.

The vertical synchronization system arranged as mentioned above performs the operations of pull-in and maintenance of the synchronization between the vertical deflection control signal from the clock counter 7 and the vertical synchronizing signal as follows.

Figure 6A:
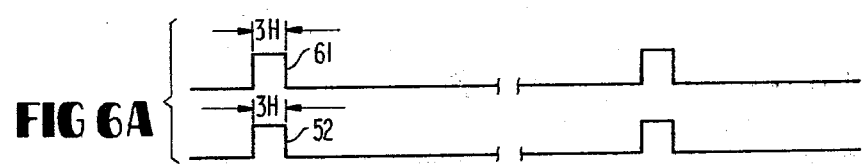
FIGS. 6A and 6B are timing charts illustrating the relationship between the vertical deflection control signal derived from the clock counter in the embodiment of this invention shown in FIG. 3 and the vertical synchronizing signal.
Figure 6B:
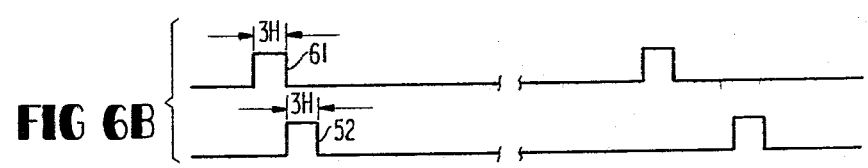

Assuming that the vertical synchronizing signal and the outputs of the counter are in an asynchronous condition as shown in FIG. 6B, the phase comparator 8 detects that the phase of the vertical synchronizing signal 52 is not coincident with the second output signal 61 from the counter 7, and supplies the rest signal to a reset terminal of the clock counter 7. Then, the clock counter 7 is reset by the reset signal. In accordance with this operation, the clock counter 7 restarts its counting operation so that the synchronization pull-in is carried out. Thus, the clock counter 7 can supply the first output signal, which is re-synchronized with the vertical synchronizing signal, to the terminal 3 and the second output signal, which is in synchronism with the vertical synchronizing signal, to the line 7". As a result, the second output signal 61 and the vertical synchronizing signal 52 are in synchronism, as illustrated in FIG. 6A. In this condition, the phase comparator 8 detects the coincidence of the phases of the second output signal 61 from the clock counter 7 and the vertical synchronizing signal 52 and therefore does not produce a reset signal, so that the clock counter 7 is not reset. In this synchronizing operation, the dead period which has been inevitable after one comparing operation in the prior art system is not present so that accurate synchronization is assured without any picture distortion or any small vibration on the reproduced picture.

Further, in an industrial television, a pattern generator or the like, where the vertical synchronizing signal from the vertical synchronizing separator circuit 5 has a narrow width of 1H, the above synchronizing operation performs by deriving a second output signal of 1H on the line 7" from the clock counter 7.

FIG. 3 shows one example of the clock counter 7 used in this invention. The clock signal is applied via the terminal 1 to a divide-by-525 clock counter composed of series connected ten T flip-flops 10–19, NAND gates 20, 21 and 22 and AND gate 23. This divide-by-525 clock counter produces at the terminal 3 the first output signal having a pulse width of 6.5H during the time period that the number of clocks reaches 513 through 525. A combined logic circuit composed of a NAND gate 22 and an AND gate 23 produces via a second output line 7" at a terminal 9 the second output signal having a pulse width of 3H during the time period that the number of clocks reaches 513 through 519. The second output line 7" is connected to the input terminal of the phase comparator 8 shown in FIG. 2 and a reset terminal 24 is connected to the output terminal of the phase comparator 8.

Further, in the vertical synchronization system of this invention, a plurarity of pulses having one or more intervals and having a total width of pulses and intervals corresponding to the pulse width of the vertical synchronizing signal may be used as the second output signal from the clock counter 7 to obtain the same advantageous effects as in the first embodiment of this invention. FIG. 4 shows another example of the clock counter 7 in which a plurarity of such pulses are obtained.

In FIG. 4, the clock counter comprises the divide-by-525 frequency divider composed of the series connected T flip-flops 10–19 and the NAND gates 20 and 21 as in the example shown in FIG. 3. The clock signal is applied via the terminal 1 and the inverter 27 to the divide-by-525 frequency divider. The divide-by-525 frequency divider produces at the terminal 3 the first output signal having a pulse width of 6.5H which is required for controlling the saw-tooth wave generator used for the vertical deflection. A combined logic circuit composed of NAND gate 25, 26 and 29 receives the respective nominal and/or inverse output signals of the flip-flops 10, 11, 12, 13, 14 and 19, and produces via the second output line 7" at a terminal 9' a series of two pulses each having a pulse width of 1H and an interval of 1H during the time period corresponding to the pulse width of the vertical synchronizing signal, i.e., the time period that the number of clocks reaches 513 through 519 as the second output signal from the clock counter 7.

Figure 7A:
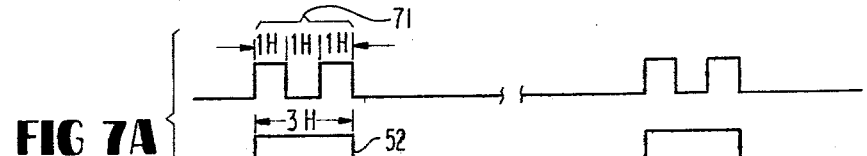
FIGS. 7A and 7B are timing charts illustrating the relationship between the vertical deflection control signal from the clock counter in the other embodiment of this invention shown in FIG. 4 and the vertical synchronizing signal.
Figure 7B:
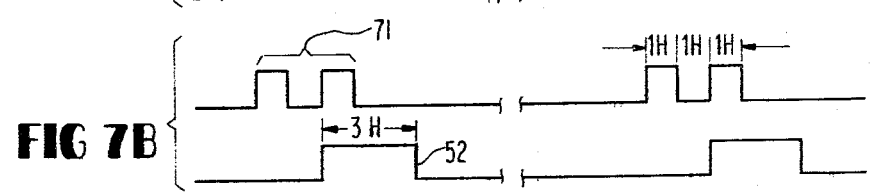

FIGS. 7A and 7B illustrate the timing charts of the second output signals 71" from the clock counter shown in FIG. 4 and the vertical synchronizing signals 52. The operations of pull-in and maintenance of the synchronization in this embodiment is the same as explained with reference to FIG. 2, so that a detailed explanation is omitted here.

Further, in the synchronization system according to this invention, it is preferable that the pulse width of the second output signal from the frequency divider 7 is made equal to a pulse width which is determined by a time constant of the vertical synchronization separator circuit 5. The pulse width of the second output signal, however, may be smaller than the pulse width determined by the time constant. The minimum pulse width of the second output signal is selected to be 1H in order to make sure the reset of the frequency divider 7.

What is claimed is:

1. A vertical synchronization system comprising:
    a first input terminal for receiving a composite synchronizing signal;
    a vertical synchronization separator for separating a vertical synchronizing signal from said composite synchronizing signal, said vertical synchronization separator having an input coupled to said first input terminal and an output for deriving said vertical synchronizing signal;
    a second input terminal for receiving a clock input signal having a frequency equal to an arbitrary positive integer N times as high as the frequency of a horizontal synchronizing signal separated from said composite synchronizing signal;
    an output terminal for deriving a first output signal having a repetition frequency substantially equal to said vertical synchronizing signal and having a pulse width required for generating a vertical deflection signal;
    a clock counter having an input coupled to said second input terminal, a first output coupled to said output terminal through coupling means, a second output, and a reset signal input, said clock counter having a series connection of a plurality of flip-flops, said first output deriving said first output signal in response to a first set of at least one output of said flip-flops, said second output deriving a second output signal in response to a second set of at least one output of said flip-flops, and said second output signal having a width equal to the pulse width of said vertical synchronizing signal; and
    a phase comparator having a first input coupled to said output of said vertical synchronization separator, a second input coupled to said second output of said clock counter, and a reset signal output coupled to said reset signal input of said clock counter, the circuit path from said second output to said reset signal input of said clock counter through said phase comparator being electrically independent from said coupling means, said phase comparator comparing phases of said vertical synchronizing signal and said second output signal and producing a reset signal at said reset signal output at the time when said phase comparator detects that one of said vertical synchronizing signal and said second output signal exists while the other does not exist, and said reset signal being applied to said clock counter for restarting the counting operation thereof.

2. A vertical synchronization system as claimed in claim 1, wherein said width of said second output signal is three horizontal scanning periods.

3. A vertical synchronization system as claimed in claim 1, wherein said clock input signal has a frequency twice as much as the frequency of said horizontal synchronizing signal, and said clock counter comprises ten flip-flops connected in cascade, the tenth flip-flop of which produces a flip-flop output signal as said first output signal, said clock counter being reset at every time that 525 clocks of said clock input signal are counted.

4. A vertical synchronization system as claimed in claim 1, wherein said second output signal has a plurarity of pulses which occur intermittently during the time corresponding to said pulse width of said vertical synchronizing signal.

5. A television receiver set comprising:
    a first input terminal for receiving a composite synchronizing signal;

a vertical synchronization separator for separating a vertical synchronizing signal from said composite synchronizing signal, said vertical synchronization separator having an input coupled to said first input terminal and an output for deriving said vertical synchronizing signal;

a second input terminal for receiving a clock input signal having a frequency equal to an arbitrary positive integer N times as high as the frequency of a horizontal synchronizing signal separated from said composite synchronizing signal;

an output terminal for deriving a first output signal having a repetition frequency substantially equal to said vertical synchronizing signal and having a pulse width required for generating a vertical deflection signal;

a clock counter having an input coupled to said second input terminal, a first output coupled to said output signal through coupling means, a second output, and a reset signal input, said clock counter having a series connection of a plurality of flip-flops, said first output deriving said first output signal in response to a first set of at least one output of said flip-flops, said second output deriving a second output signal in response to a second set of at least one output of said flip-flops, and said second output having a width equal to the pulse width of said vertical synchronizing signal;

a phase comparator having a first input coupled to said output of said vertical synchronization separator, a second input coupled to said second output of said clock counter, and a reset signal output coupled to said reset signal input of said clock counter, the circuit path from said second output to said reset signal input of said clock counter through said phase comparator being electrically independent from said coupling means, said phase comparator comparing phases of said vertical synchronizing signal and said second output signal and producing a reset signal at said reset signal output at the time when said phase comparator detects that one of said vertical synchronizing signal and said second output signal exists while the other does not exist, and said reset signal being applied to said clock counter for restarting the counting operation thereof; and vertical deflection means having an input coupled to said output terminal for receiving said first output signal, and producing a vertical deflection signal in response to said first output signal.

6. A television receiver as claimed in claim 5, said first output signal from said clock counter has a pulse width equal to 6.5 times as long as the horizontal scanning period and said second output signal has a pulse width equal to three times as long as the horizontal scanning period.

* * * * *